(12) United States Patent
Wentink

(10) Patent No.: US 6,791,962 B2
(45) Date of Patent: Sep. 14, 2004

(54) DIRECT LINK PROTOCOL IN WIRELESS LOCAL AREA NETWORKS

(75) Inventor: Maarten Menzo Wentink, Utrecht (NL)

(73) Assignee: Globespan Virata, Inc., Red Bank, NJ (US)

(*) Notice: Subject to any disclaimer, the term of this patent is extended or adjusted under 35 U.S.C. 154(b) by 61 days.

(21) Appl. No.: 10/353,391

(22) Filed: Jan. 29, 2003

(65) Prior Publication Data

US 2003/0231608 A1 Dec. 18, 2003

Related U.S. Application Data

(60) Provisional application No. 60/388,569, filed on Jun. 12, 2002.

(51) Int. Cl.[7] .................................................. H04Q 7/24
(52) U.S. Cl. ........................ 370/338; 370/311; 370/346
(58) Field of Search ................................. 370/310, 328, 370/336, 337, 338, 345, 346, 347, 348, 311, 445, 449, 461, 462; 709/238, 242; 340/825.72

(56) References Cited

U.S. PATENT DOCUMENTS

| | | | |
|---|---|---|---|
| 5,371,734 A | * 12/1994 | Fischer | ........................ 370/311 |
| 5,487,069 A | 1/1996 | O'Sullivan | |
| 5,636,220 A | 6/1997 | Vook | |
| 5,768,531 A | 6/1998 | Lin | |
| 5,991,287 A | * 11/1999 | Diepstraten et al. | ........ 370/338 |
| 5,995,849 A | 11/1999 | Williams | |
| 6,047,178 A | 4/2000 | Frlan | |

OTHER PUBLICATIONS

ANSI/IEEE Std 802.11, Part 11: Wireless LAN Medium Access Control (MAC) and Physical Layer (PHY) Specification, pp. 1–513, 1999.*

ETSI TR 101 683 V1.1.1, Broadband Radio Access Networks; HIPERLAN Type 2; System Overview, pp. 1–19, 2000.*

Kamerman et al, WaveLan–II: A High–Performance Wireless LAN for the Unlicensed Band, Bell Labs Technical Journal, pp. 118–133, 1997.*

* cited by examiner

Primary Examiner—Frank Duong
(74) Attorney, Agent, or Firm—DeMont & Breyer, LLC

(57) ABSTRACT

A technique enabling enhanced stations to communicate with other enhanced stations that periodically or sporadically enter power save mode is disclosed. If a Q-station targeted for a direct link is in power save mode, an access point "wakes" the Q-station. The targeted Q-station responds by transmitting back a PS-Poll frame. The access point then forwards an awaiting direct_link_protocol_request frame to the targeted Q-station, which then responds by transmitting back a direct_link_protocol_response frame to the transmitting Q-station. Subsequently, the targeted Q-station can expect to receive a frame directly from a Q-station requesting the direct link. For example, a data frame containing data or a direct_link_protocol_probe frame can be transmitted. In this way, Q-stations do not have to track when other Q-stations are in power save mode.

23 Claims, 12 Drawing Sheets

WIRELESS
COMMUNICATION
SYSTEM 300

DIRECT LINK PROTOCOL IN WIRELESS LOCAL AREA NETWORKS

CROSS-REFERENCE TO RELATED APPLICATIONS

This application claims the benefit of, and incorporates by reference, U.S. Provisional Patent Application Serial No.: 60/388,569, entitled "Direct Stream Request Protocol (DSRP)," filed on Jun. 12, 2002.

FIELD OF THE INVENTION

The present invention relates to telecommunications in general, and, more particularly, to an IEEE 802.11 wireless local area network.

BACKGROUND OF THE INVENTION

FIG. 1 depicts a schematic diagram of a portion of wireless telecommunication system 100 in the prior art, which comprises stations 101-1 through 101-5 and access point 102. Stations 101-1 through 101-5 and access point 102 can communicate with each other within shared communications network 103 and with wired backbone network 104 via access point 102. Stations 101-1 through 101-5 and access point 102 constitute an IEEE 802.11(a) or 802.11(b) wireless local area network (hereinafter also called a "WLAN"). An IEEE 802.11(b) network is also known as a "Wi-Fi" network.

Stations 101-1 through 101-5 are computing devices capable of communicating with each other using wireless network interfaces and, together, constitute a basic service set (hereinafter also called a "BSS"). A basic service set can be regarded as a building block for an 802.11-based network. Access point 102 enables stations 101-1 through 101-5 to communicate with the rest of the world via wired backbone network 104. Stations 101-1 through 101-5 and access point 102 communicate with each other through a wireless medium, which is depicted as shared communications network 103.

Wireless telecommunication system 100 is classified as an infrastructure BSS because it comprises an access point. An infrastructure BSS is contrasted with an independent BSS, or IBSS, which does not comprise an access point. In wireless telecommunication system 100, access point 102 is involved in all communications, including those in which two stations (e.g., stations 101-1 and 101-5, etc.) communicate with each other. This is because the infrastructure BSS has a logical star topology, and, therefore, access point 102 relays all communications between stations in the BSS.

Referring to FIG. 2A, if station 101-1 wishes to send, for example, a data frame to station 101-5, station 101-1 first sends data frame 201 to access point 102. Access point 102 then attempts to relay data frame 201 to access point 102. To accomplish this, access point 102 first checks to see if station 101-5 is in active mode, and, therefore, is ready to receive the relayed frame. Station 101-5 might, however, be in power save mode, and, therefore, not ready to receive the relayed frame.

When a station is in power save mode, the station has placed its transmitter and receiver in a low power state to conserve power, and, therefore cannot transmit or receive. In accordance with a predictable schedule, a station in power save mode powers up its receiver periodically to determine if the access point has any frames waiting for it. The access point knows when the stations in its BSS wake up from power save mode and initiates a message transaction. Referring again to FIG. 2A, in message transaction 202, access point 102 transmits a beacon frame that comprises a traffic indication map. Station 101-5 then transmits a PS-Poll frame, requesting that the frame be sent. Access point 102 then forwards the data frame to station 101-5. Additional frames from station 101-1 through access point 102 can follow.

Similarly, station 101-5 might have one or more data frames to send back to station 101-1, which is depicted in FIG. 2B. Station 101-5 transmits data frame 203. Access point 102 then initiates message transaction 204 with station 101-1, and delivers the data frames.

Direct communication between stations 101-1 and 101-5 is often desirable, but it is problematic because a transmitting station would not know if an intended receiving station were in power save mode and, therefore, unable to receive frames.

SUMMARY OF THE INVENTION

The present invention provides a technique that enables a first 802.11 enhanced station to communicate with a second 802.11 enhanced station directly, even when the second station periodically or sporadically enters power save mode. Furthermore, enhanced stations such as those in the illustrative embodiment are backwards compatible, and, therefore, can operate in a basic service set comprising legacy stations.

In accordance with the illustrative embodiment of the present invention, an enhanced station, hereinafter called a Q-station, requests a direct link with another Q-station (i.e., the targeted Q-station) by first transmitting a direct_link_protocol_request frame to an access point. The access point and not the requesting Q-station then determines if the targeted Q-station is in power save mode. If the targeted Q-station is in power save mode, the access point "wakes" the Q-station by transmitting a beacon frame that comprises a traffic indication map. This wakes the targeted Q-station and causes it to respond by transmitting back to the access point a PS-Poll frame. When the access point receives the PS-Poll frame, the access point responds by forwarding the direct_link_protocol_request frame from the requesting Q-station to the targeted Q-station.

The targeted Q-station then responds by transmitting back a direct_link_protocol_response frame to the requesting Q-station, either through the access point or directly. The targeted Q-station then knows to expect a frame directly from the requesting Q-station. That frame might be, for example, a direct_link_protocol_probe frame to test the suitability of the direct link or a data frame.

The illustrative embodiment of the present invention comprises: receiving at an access point from a first Q-station a direct_link_protocol_request frame that indicates a second Q-station as the destination of the direct_link_protocol_request frame; transmitting from the access point a traffic indication map that indicates that traffic is available for the second Q-station; receiving at the access point, in response to the transmission of the traffic indication map, a PS-Poll frame from the second Q-station; and forwarding from the access point, in response to the reception of the PS-Poll frame, the direct_link_protocol_request frame to the second Q-station.

DETAILED DESCRIPTION

Figure 1:
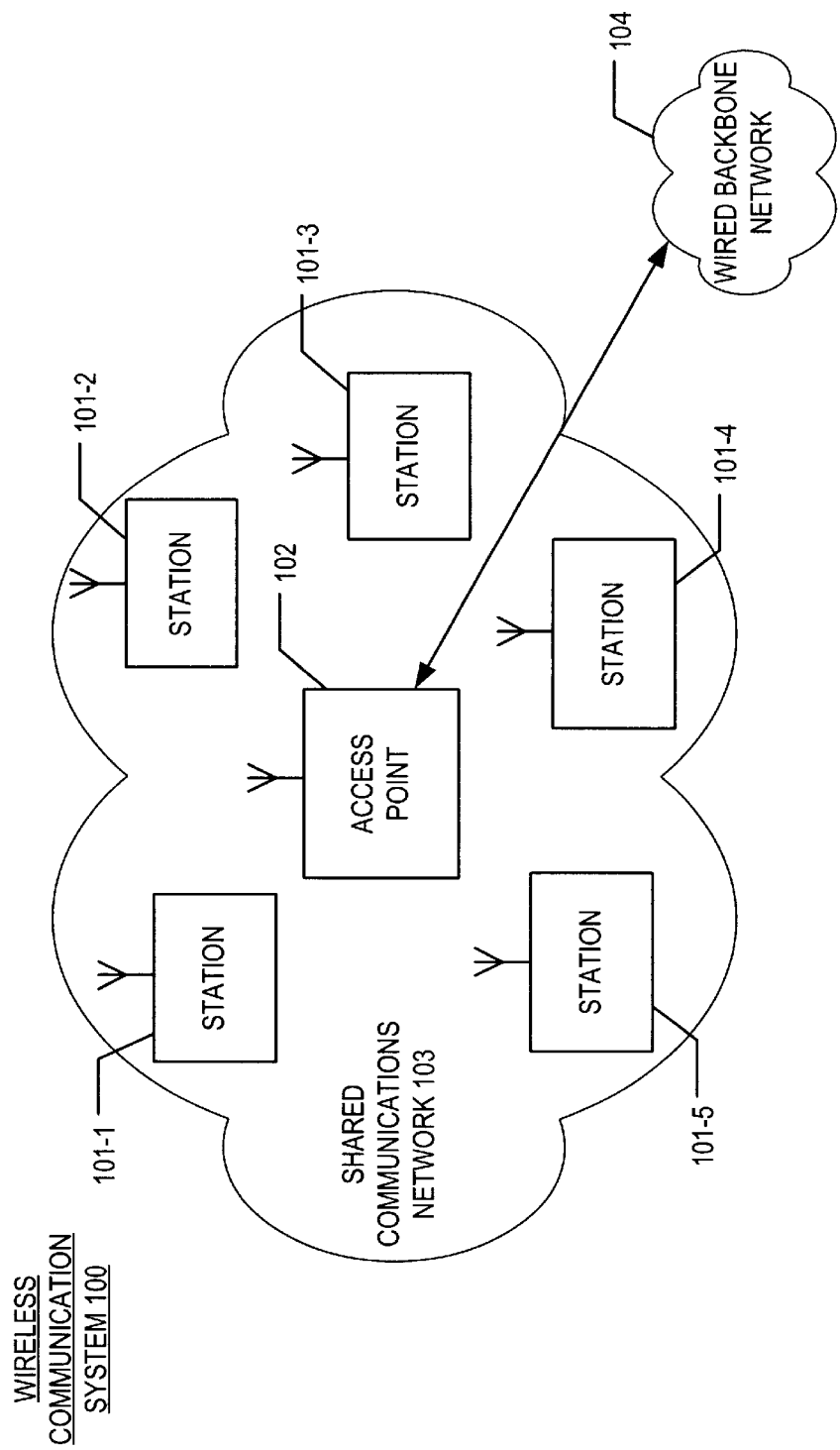
FIG. 1 depicts a schematic diagram of wireless telecommunication system 100 in the prior art.
Figure 2A:
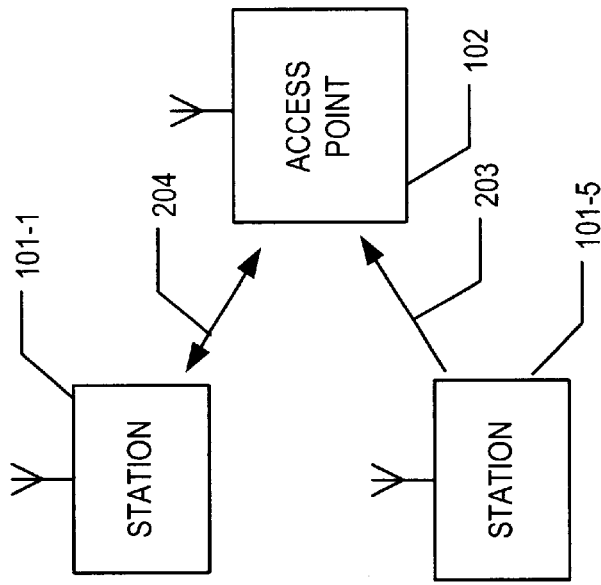
FIG. 2A and FIG. 2B each depict a schematic diagram of station 101-1, station 101-5, and access point 102 in the prior art.
Figure 2B:
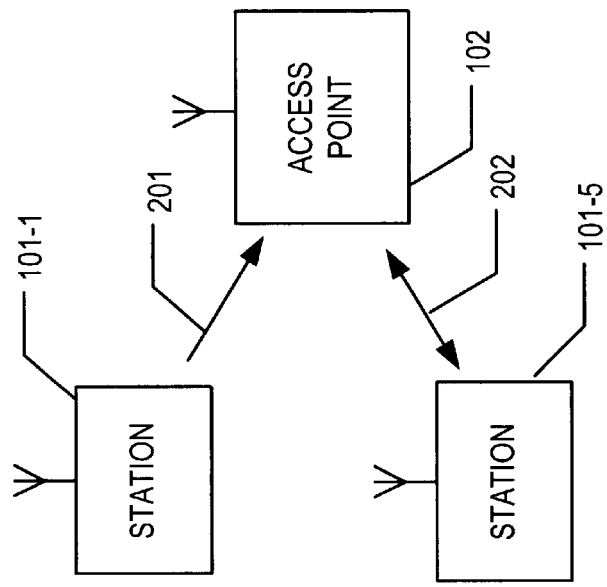
Figure 3:
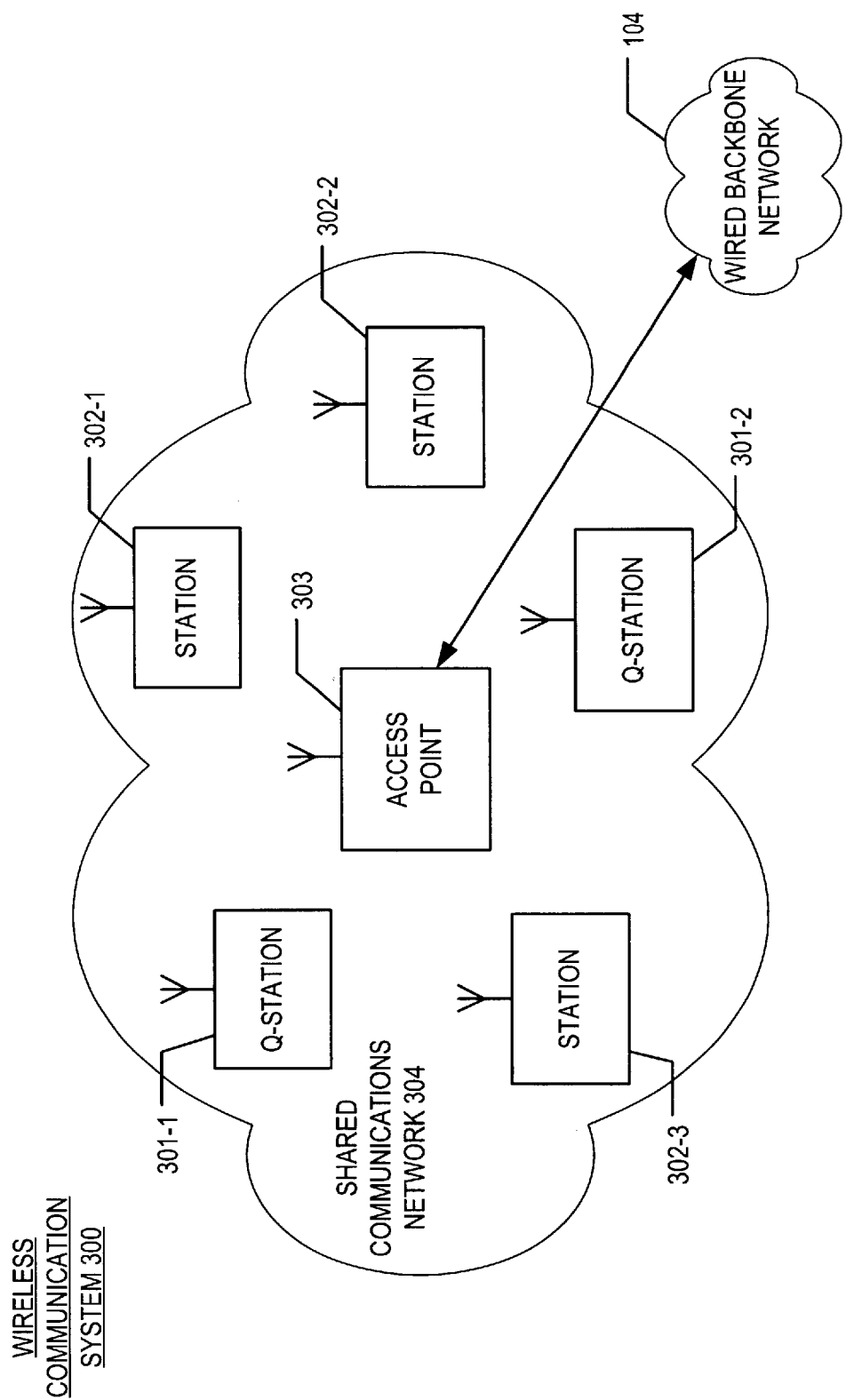
FIG. 3 depicts a schematic diagram of wireless telecommunication system 300, in accordance with the illustrative embodiment of the present invention.

FIG. 3 depicts a schematic diagram of the illustrative embodiment of the present invention, wireless telecommunication system 300. Wireless telecommunication system 300 transmits signals between Q-stations 301-1 through 301-M, wherein M is a positive integer, stations 302-1 through 302-N, wherein N is a positive integer, and access point 303. These elements transmit signals over shared communications network 304. Each of stations 301-1 through 301-M and stations 302-1 through 302-N can be a stationary, portable, or mobile type with different types in the mix. The differences between stations and Q-stations will be described later.

In accordance with the illustrative embodiment, wireless communications system 300 is a packet-switched network, in contrast to a circuit-switched network, as is well known to those skilled in the art. In other words, a macro data structure (e.g., a text file, a portion of a voice conversation, etc.) of indefinite size is not necessarily transmitted across shared communications network 304 intact, but rather might be transmitted in small pieces.

Each of these small pieces is encapsulated into a data structure called a "data frame," and each data frame traverses shared communications network 304 independently of the other data frames. The intended receiver of the macro data structure collects all of the data frames as they are received, recovers the small pieces of data from each, and reassembles them into the macro data structure.

Shared communications network 304 can be a wireless or wireline or hybrid wireless and wireline network; the illustrative embodiment, however, uses a wireless network for illustrative purposes. A salient characteristic of shared communications network 304 is that every data frame transmitted on shared communications network 304 by any station is received or "seen" by every station and Q-station on shared communications network 304, regardless of whether the data frame was intended for it or not. In other words, shared communications network 304 is effectively a broadcast medium.

If shared communications network 304 is wireless, in whole or in part, embodiments of the present invention can use a variety of radio or optical frequencies and transmission methods. Possible radio frequency spectrum, if used, includes the Industrial, Scientific, and Medical (ISM) frequency bands in the ranges of 2.4 GHz and 5.0 GHz. Shared communications network 304 can constitute a wireless local area network, such as an IEEE 802.11-based network.

It will be clear to those skilled in the art how to make and use shared communications network 304. It will also be clear to those skilled in the art that the shared communications network depicted in FIG. 3 is illustrative only and that other types of communications networks are within the scope of the present invention.

Wired backbone network 104 is also a packet-switched network, in contrast to a circuit-switched network, as is well known to those skilled in the art. Similarly to shared communications network 304, wired backbone network 104 can transfer one or more macro data structures of indefinite size, not necessarily transmitted intact, but rather possibly transmitted in small pieces. Wired backbone network 104 connects to shared communications network 304 through access point 303. Wired backbone network 104 might be connected to other shared communications networks, to another type of network (e.g., circuit-switched, etc.), or both. It will be clear to those skilled in the art how to make and use wired backbone network 104.

Q-stations 301-$h$, for h=1 to M, and stations 302-$i$, for i=1 to N, receive or generate the macro data structure and prepare it for transmission over shared communications network 304. The macro data structure can represent, for example, telemetry, text, audio, video, etc.

In accordance with the illustrative embodiment of the present invention, Q-station 301-$h$ and station 302-$i$ are not of identical capability. Situations involving stations with heterogeneous capabilities can occur, for example, where latest-capability stations are added to a telecommunication system that comprises only legacy stations. Additionally, the situation can result where some, but not all, of the stations in a telecommunications system are upgraded with additional capabilities. Whatever the reason, it will be clear to those skilled in the art why telecommunications systems exist that comprise stations with heterogeneous capabilities.

In accordance with the illustrative embodiment of the present invention, stations 302-$i$, for i=1 to N, are capable of communication using an older message set, but not a newer message set. For the purposes of this specification, these stations are herein called "legacy stations" or merely "stations." The example of a legacy station in the illustrative embodiment is an 802.11(a)-capable or 802.11(b)-capable station. In contrast, quality of service (QoS)-enhanced stations 301-$h$, for h=-1 to M, are capable of transmission using the newer message set, in addition to the older message set. For the purposes of this specification, these stations are hereinafter called "upgraded stations" or "Q-stations." (The "Q" signifies "QoS-enhanced.")

An upgraded station in the illustrative embodiment is capable of using direct link protocol messaging, in addition to the pre-existing (i.e., older) message set. Direct link protocol messaging constitutes 802.11(e) standards. In accordance with the illustrative embodiment of the present invention, legacy stations and upgraded stations are capable of communicating with each other because the upgraded stations transmit data frames that are intended for legacy stations through access point 303. Furthermore, if an upgraded station attempts via access point 303 to establish a direct link to a legacy station, access point 303 can intervene.

The direct link protocol message set comprises three messages (also called "frames"): the direct_link_protocol_request message, the direct_link_protocol_response message, and the direct_link_protocol_probe message. The direct_link_protocol_request frame enables the Q-station originating the direct link to request that a direct link be set up with the target Q-station. The direct_link_protocol_request frame comprises a destination medium access control address and a source medium access control address, as well as capability information, supported rates information, and extended capabilities information of the Q-station originating the direct_link_protocol_request.

The direct_link_protocol_response frame enables the Q-station originating the response to indicate that a direct link is permitted (or denied, as described later). The direct_link_protocol_response frame comprises a destination medium access control address and a source medium access control address, as well as capability information, supported rates information, and extended capabilities information of the Q-station originating the direct_link_protocol_response.

The direct_link_protocol_probe frame enables the Q-station originating the probe to gauge the quality of the direct link between the two Q-stations involved. The direct_link_protocol_probe frame comprises a destination medium access control address and a source medium access control address, as well as random data.

Additionally, the direct link protocol frames can be used to attach security information elements to convey security information between two Q-stations.

Access point 303 functions as a bridge between shared communications network 304 and wired backbone network 104. In functioning as a bridge, access point 303 receives data frames from wired backbone network 104 and transmits them to one or more of Q-stations 301-*h*, for h=1 to M or stations 302-*i*, for i=1 to N. Furthermore, access point 303 also receives data frames from one or more of Q-stations 301-*h* for h=1 to M or stations 302-*i*, for i=1 to N, and transmits the frames to wired backbone network 104. In addition, access point 303 also relays data frames between any two of Q-stations 301-*h* for h=1 to M and stations 302-*i*, for i=1 to N, at any given moment. It will be clear to those skilled in the art how to relay frames between two points through access point 303.

Figure 4:
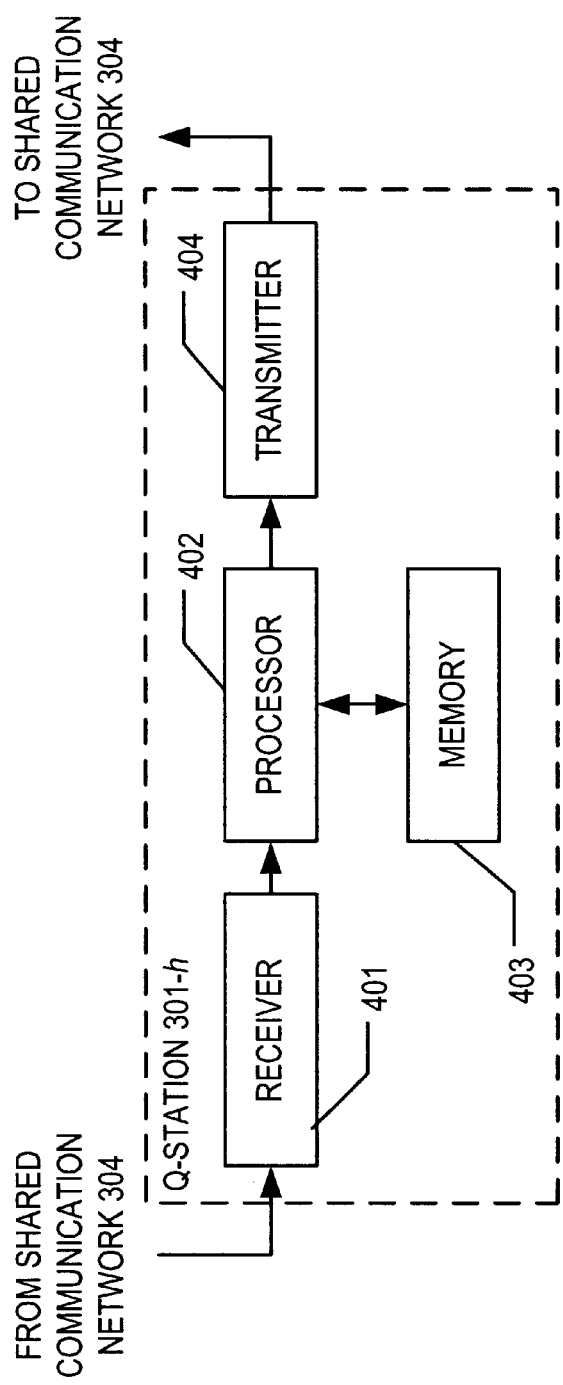
FIG. 4 depicts a block diagram of the salient components of Q-station 301-$h$, for h=1 through N, in accordance with the illustrative embodiment of the present invention.

FIG. 4 depicts a block diagram of the salient components of Q-station 301-*h*, for h=1 through N, in accordance with the illustrative embodiment of the present invention. Receiver 401 comprises the wireless or wireline or hybrid wireless and wireline interface circuitry that enables Q-station 301-*h* to receive data frames from communications network 304. When receiver 401 receives a data frame from shared communications network 304, it passes the data frame to processor 402 for processing. It will be clear to those skilled in the art how to make and use receiver 401.

Processor 402 is a general-purpose or special-purpose processor that is capable of performing the functionality described below and with respect to FIGS. 6 through 14. In particular, processor 402 is capable of storing data into memory 403, retrieving data from memory 403, and of executing programs stored in memory 403. Memory 403 accommodates input queues and output queues for incoming data and outgoing messages (including data frames), respectively. It will be clear to those skilled in the art how to make and use processor 402 and memory 403.

Transmitter 404 comprises the wireless or wireline or hybrid wireless and wireline interface circuitry that enables Q-station 301-*h* to transmit data frames onto shared communications network 304. It will be clear to those skilled in the art how to make and use transmitter 404.

Figure 5:
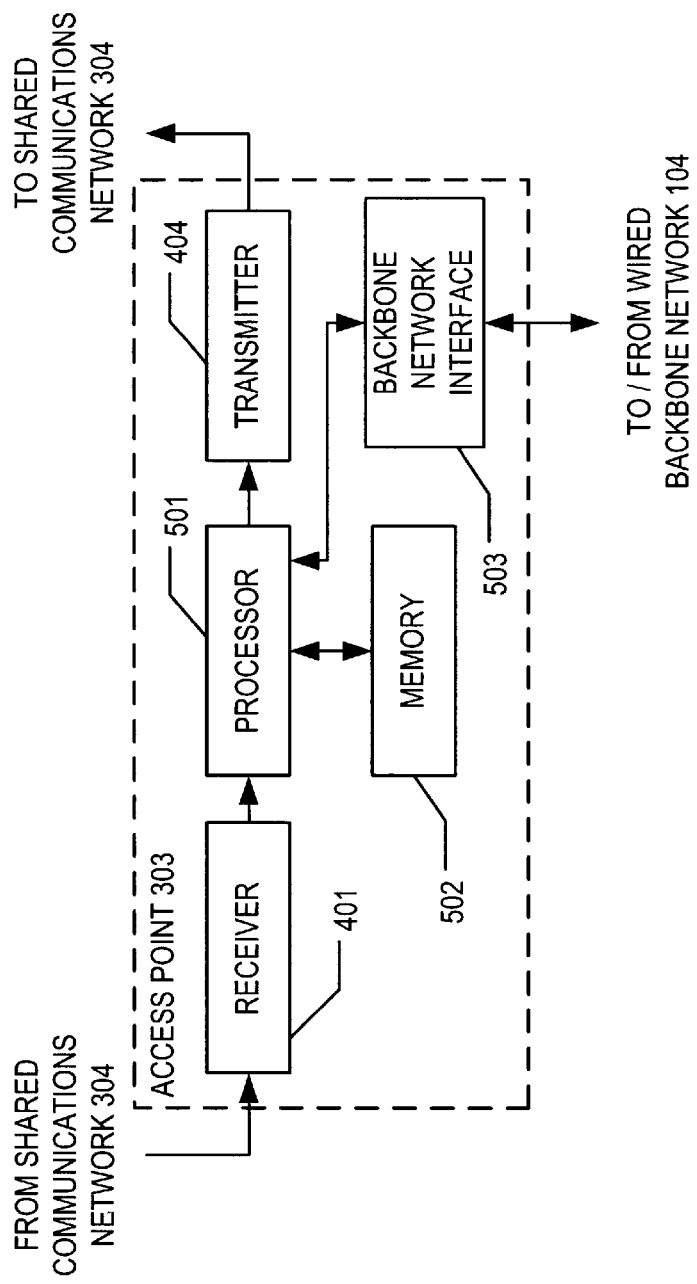
FIG. 5 depicts a block diagram of the salient components of access point 303 in accordance with the illustrative embodiment of the present invention.

FIG. 5 depicts a block diagram of the salient components of access point 303, in accordance with the illustrative embodiment of the present invention. Receiver 401 and transmitter 404 are equivalent to those depicted in FIG. 4 and have already been described.

Processor 501 is a general-purpose or special-purpose processor that is capable of performing the functionality described below and with respect to FIGS. 6 through 14. In particular, processor 501 is capable of storing data into memory 502, retrieving data from memory 502, and of executing programs stored in memory 502. Memory 502 accommodates input queues and output queues for incoming data and outgoing messages (including data frames), respectively. Incoming and outgoing messages are communicated via receiver 401, transmitter 404, and backbone interface 503. It will be clear to those skilled in the art how to make and use processor 501 and memory 502.

Backbone network interface 503 comprises the interface circuitry that enables access point 303 to transmit data frames onto and to receive data frames from wired backbone network 104. It will be clear to those skilled in the art how to make and use backbone network interface 503.

Figure 6:
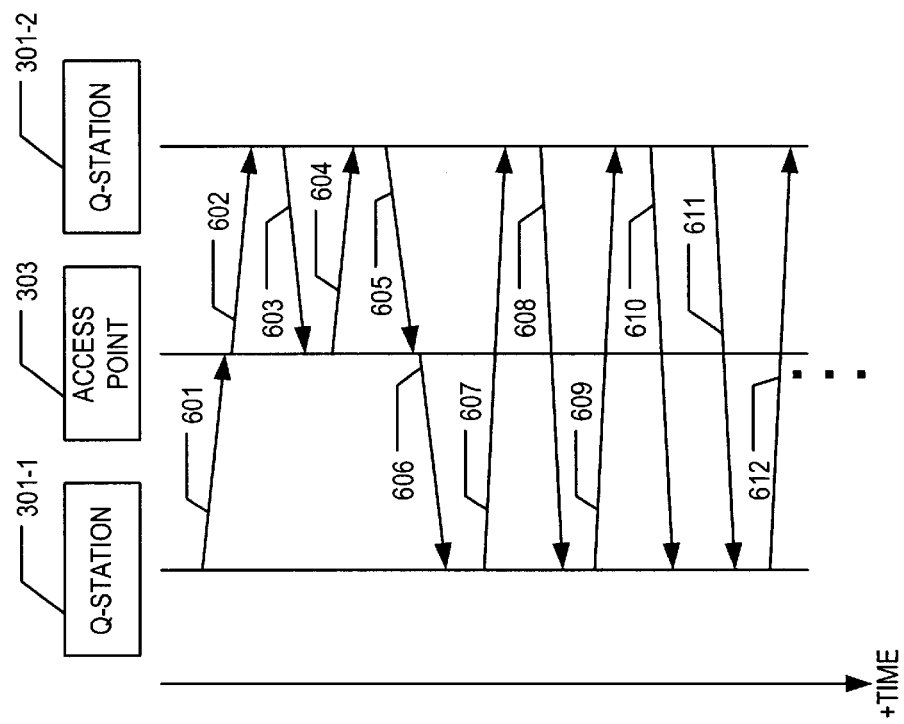
FIG. 6 depicts a message flow diagram of the first variation of the first embodiment of the present invention.

If Q-station 301-1 is to communicate directly with Q-station 301-2, Q-station 301-1 must first use access point 303 to set up a direct link, in accordance with the illustrative embodiment. Note that the message flows subsequently described can pertain to any two Q-stations and that Q-stations 301-1 and 301-2 are used as illustrative examples. As depicted in FIG. 6, Q-station 301-1 transmits first direct_link_protocol_request frame 601 to access point 303, which queues, but does not transmit for the moment, second direct_link_protocol_request frame 604. Frame 604 essentially is equivalent to frame 601, except that the addressing is updated to indicate the target destination (in this case, Q-station 301-2) as the intended immediate recipient of the frame.

Alternatively, access point 303 can autonomously attempt to initiate a direct link between Q-stations 301-1 and 301-2. It does so by queuing, but not transmitting for the moment, second direct_link_protocol_request frame 604 without necessarily receiving first direct_link_protocol_request frame 601 from Q-station 301-1.

Whether or not any two Q-stations in wireless telecommunication system 300 want to communicate directly with each other depends, at least in part, on the underlying application and macro data structure. It will be clear to those skilled in the art how to determine when direct communication should be used, as opposed to using access point 303 as a relay of the data frames.

Access point 303 then determines whether or not Q-station 301-2 is in power save mode, in well-known fashion. If Q-station 301-2 is in power save mode, then access point 303 indicates to Q-station 301-2 that a frame is waiting. Q-station 301-2 is made aware of this the next time access point 303 transmits a traffic indication map (TIM) in beacon frame 602. It will be clear to those skilled in the art how to format and transmit beacon frame 602 comprising a traffic indication map.

Q-station 301-2 wakes up from power save mode to read beacon frames. In this case, Q-station 301-2 sees beacon frame 602 and that it comprises information pertinent to Q-station 301-2. Recognizing that access point 303 has one or more queued frames waiting, Q-station 301-2 transmits PS-Poll frame 603 to access point 303 to retrieve the queued frame or frames, in well-known fashion. At this point, Q-station 301-2 does not know that the queued frame carries with it a request to establish a direct link from Q-station 301-1.

Note that the beacon frame/PS-Poll frame transaction described pertains to the contention-based service in 802.11 called distribution coordination function (DCF). During the contention-free service associated with the point coordination function (PCF) in 802.11, however, an access point has a different means of transmitting saved (queued) frames to stations or Q-stations that have been in power save mode. It will be clear to those skilled in the art how to transmit saved frames during contention-free service from an access point to stations or Q-stations that have been in power save mode and that are PCF-capable. Furthermore, it will be clear to those skilled in the art how to transmit frames in general to stations or Q-stations that are PCF-capable using contention-free service.

Access point 303, upon receiving PS-Poll frame 603 from Q-station 301-2, transmits second direct_link_protocol_request frame 604 to Q-station 301-2. Second direct_link_protocol_request frame 604 carries information intended by Q-station 301-1 for Q-station 301-2.

Q-station 301-2 receives second direct_link_protocol_request frame 604 and, in response, transmits first direct_link_protocol_response frame 605 back to access point 303.

Access point 303 relays the content of first direct_link_protocol_response frame 605, when received, to Q-station 301-1 via second direct_link_protocol_response frame 606. Frame 606 essentially is equivalent to frame 605, except that the addressing is updated to identify that Q-station 301-1 is the intended immediate recipient of the frame.

In accordance with the illustrative embodiment, when Q-station 301-1 receives second direct_link_protocol_response frame 606, it knows that it has permission to communicate directly with Q-station 301-2, even in the presence of access point 303. Q-station 301-1 may try to communicate immediately with one or more data frames, or Q-station 301-1 may first transmit direct_link_protocol_probe frame 607 to Q-station 301-2. Direct_link_protocol_probe frame 607 contains no user data; its purpose is mainly to establish that Q-stations 301-1 and 301-2 are sufficiently proximate to each other to enable direct communication with each other. If Q-station 301-2 receives direct_link_protocol_probe frame 607, Q-station 301-2 acknowledges the frame by transmitting acknowledgement frame 608 (e.g., null frame, acknowledgement frame, etc.), implying that direct_link_protocol_probe frame 607 has been received, back to Q-station 301-1 in well-known fashion.

At any time that the direct link is in effect, Q-station 301-1 can send a direct_link_protocol_probe frame (such as frame 607) to station 301-2. Likewise, Q-station 301-2 can send a direct_link_protocol_probe frame to station 301-1 at any time that the direct link is in effect. This might be necessary, for example, when Q-station 301-1, Q-station 301-2, or both are moving, in which case, the quality of the direct link is possibly changing and needs to be reassessed over time. It will be clear to those skilled in the art to determine when one Q-station should send a direct_link_protocol_probe frame to another Q-station.

When Q-station 301-1 has permission to do so (i.e., by having received direct_link_protocol_response frame 606), it can also exchange data frames via direct link with Q-station 301-2. Q-station 301-1 transmits data frame 609 to Q-station 301-2 in well-known fashion. When Q-station 301-2 receives data frame 609, it transmits acknowledgement frame 610 back to Q-station 301-1 in well-known fashion. Also, Q-station 301-2 can transmit data frame 611 to Q-station 301-1, which, in turn, transmits acknowledgement frame 612 back to Q-station 301-2 in well-known fashion.

While Q-stations 301-1 and 301-2 are exchanging frames via direct link, they are doing so while taking into account the capability information, supported rates information, and extended capabilities information of each other exchanged during set up of the direct link. These information types are defined in the 802.11(e) standard, which is incorporated by reference. It will be clear to those skilled in the art how to adapt communications to account for the specific limitations and capabilities of each Q-station.

While the direct link is in effect, Q-stations 301-1 and 301-2 remain active (i.e., do not go into power save mode). Therefore, access point 303 is not continually needed to wake up Q-stations that are already in direct link mode.

Once configured to do so, Q-stations 301-1 and 301-2 can exchange frames until the Q-stations revert to requiring access point 303 to act as a relay. In the illustrative embodiment, for Q-station 301-2, this occurs when at least a specified time interval has elapsed after Q-station 301-2 transmits direct_link_protocol_response frame 605. For Q-station 301-1, this occurs when at least a specified time has elapsed after Q-station 301-1 receives direct_link_protocol_response frame 606. Alternatively, each Q-station reverts when at least a specified time (e.g., time aDLPIdleTimeout, etc.) has elapsed after that Q-station has exchanged a frame on the direct link with another Q-station without receiving from or transmitting to that other Q-station a subsequent direct link frame. The interval can be determined through simulations, empirically, by trial-or-error, or by other means. It will be clear to those skilled in the art how to determine the time interval after which the Q-stations revert to requiring access point 303 to act as a relay between them.

Figure 7:
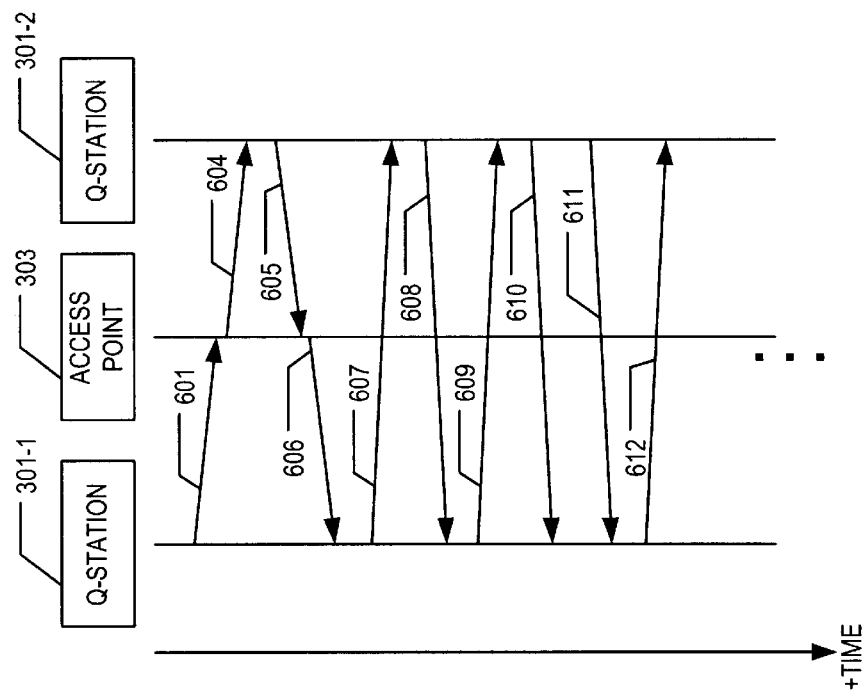
FIG. 7 depicts a message flow diagram of the second variation of the first embodiment of the present invention.

FIG. 7 depicts a second variation of the first embodiment of the present invention. After receiving first direct_link_protocol_request frame 601 or autonomously generating a direct_link protocol_request, access point 303 then determines whether or not Q-station 301-2 is in power save mode. If Q-station 301-2 is not in power save mode, then access point 303 can transmit second direct_link_protocol_request frame 604 to Q-station 301-2 without the use of frames related to bringing a Q-station out of power save mode (i.e., frames 602 and 603). The message flow then progresses as described for FIG. 6.

Figure 8:
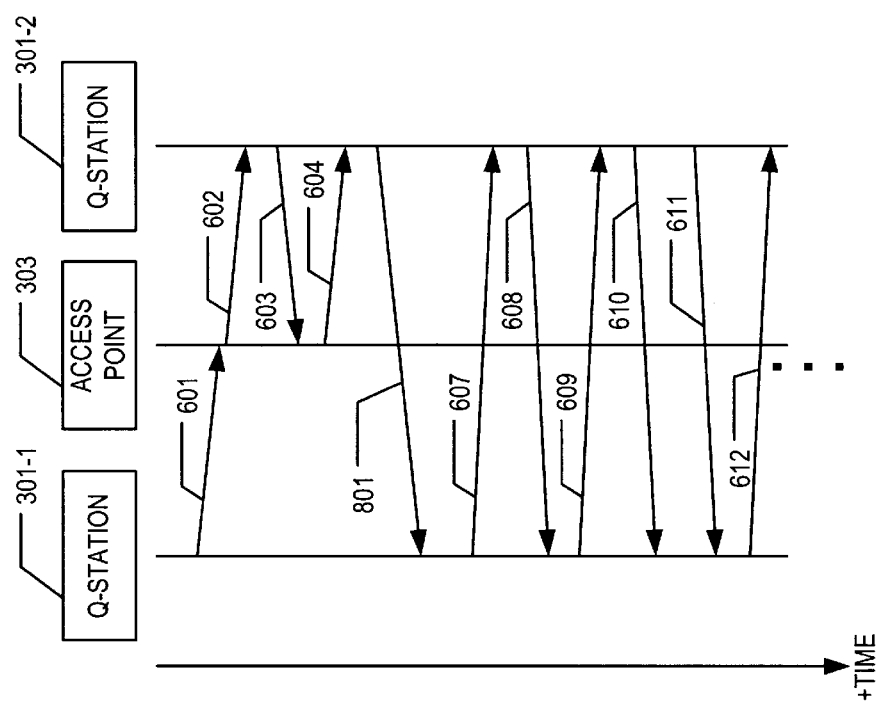
FIG. 8 depicts a message flow diagram of the second embodiment of the present invention.

FIG. 8 depicts the second embodiment of the present invention. Access point 303 either receives first direct_link_protocol_request frame 601 from Q-station 301-1 or queues on its own a direct_link_protocol_request_for Q-station 301-2.

Access point 303 then determines whether or not Q-station 301-2 is in power save mode, in well-known fashion. As described earlier, if Q-station 301-2 is in power save mode, then access point 303 and Q-station 301-2 exchange messages (i.e., beacon frame 602 comprising TIM information and PS-Poll frame 603) to bring Q-station 301-2 into a state in which it can receive frames from access point 303.

Access point 303, upon receiving PS-Poll frame 603 (if applicable) from Q-station 301-2, transmits second direct_link_protocol_request frame 604 to Q-station 301-2. Second direct_link_protocol_request frame 604 carries information intended by Q-station 301-1 for Q-station 301-2.

In the second embodiment, Q-station 301-2 receives second direct_link_protocol_request frame 604 and, in response, transmits direct_link_protocol_response frame 801 directly to Q-station 301-1. Transmitting the frame directly to Q-station 301-1 has the effect of testing whether or not Q-station 301-1 and Q-station 301-2 are sufficiently close to each other for direct communication, in addition to notifying Q-station 301-1 that a direct link is permitted.

In accordance with the illustrative embodiment, when Q-station 301-1 receives direct_link_protocol_response frame 801, it knows that it has permission to communicate directly with Q-station 301-2, even in the presence of access point 303. Q-stations 301-1 and 301-2 can then exchange messages directly as described for FIG. 6.

Figure 9:
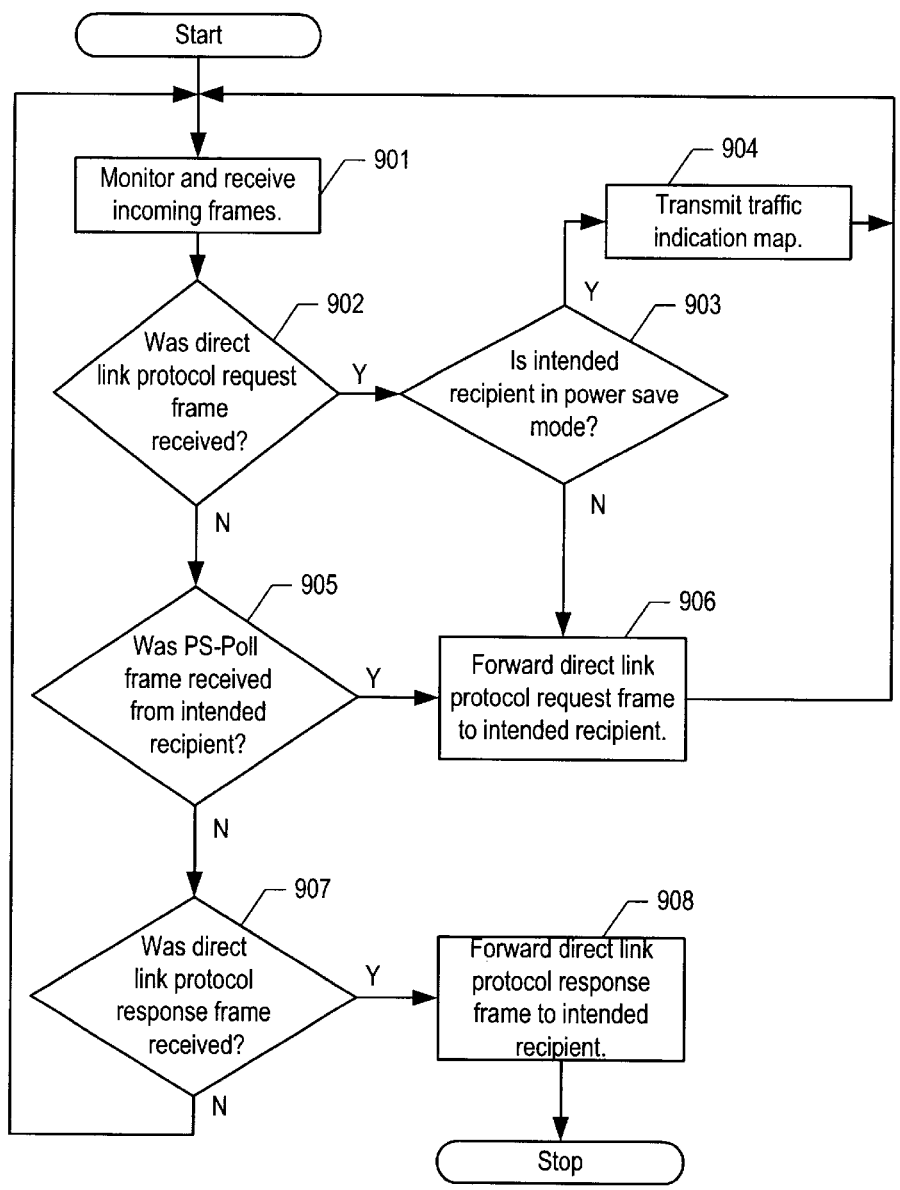
FIG. 9 depicts a flowchart of the tasks performed by access point 303, in accordance with the illustrative embodiment of the present invention.

FIG. 9 depicts a flowchart of the tasks constituting the illustrative embodiment of the present invention and performed by access point 303. It will be clear to those skilled in the art which of the tasks depicted in FIG. 9 can be performed simultaneously or in a different order than that depicted.

At task 901, access point 303 monitors shared communications network 300 for incoming frames and receives the frames. For each received frame, access point 303 also decodes the frame to determine the frame type, whether or not access point 303 is the intended recipient of the frame, and other characteristics of the frame. It will be clear to those skilled in the art how to monitor for incoming frames and to receive and decode intended frames. It will also be clear to those skilled in the art how to recognize the particular type of frame received.

When a frame for access point 303 is present, access point 303 takes additional action, as subsequently described.

At task 902, access point 303 determines if the received and decoded frame is a direct_link_protocol_request frame. If not, control proceeds to task 905. If the received frame is a direct_link_protocol_request frame, control proceeds to task 903.

At task 903, access point 303 determines if the target destination (e.g., Q-station 301-2, etc.) of the direct_link_protocol_request frame is in power save mode in well-known fashion. If not, control proceeds to task 906. If the target destination is in power save mode, control proceeds to task 904.

At task 904, access point 303 transmits a traffic indication map (TIM) in well-known fashion, in which the target destination of the direct_link_protocol_request frame is notified of the pending frame. The TIM can be transmitted in a beacon frame at regular intervals. It will be clear to those skilled in the art how to format and transmit TIM information within a beacon frame and when to transmit the frame.

After transmitting the TIM, control in access point 303 proceeds to task 901. Meanwhile, access point 303 saves the direct_link_protocol_request frame for later use.

At task 905, access point 303 determines if the received and decoded frame is a PS-Poll frame. If not, control proceeds to task 907. If the received frame is a PS-Poll frame, control proceeds to task 906.

At task 906, access point 303 forwards the direct_link_protocol_request frame received earlier to the target destination. Control in access point 303 proceeds to task 901.

At task 907, access point 303 determines if the received and decoded frame is a direct_link_protocol_response frame. If not, control proceeds to task 901. If the received frame is a direct_link_protocol_response frame, control proceeds to task 908.

At task 908, access point 303 forwards the direct_link_protocol_response frame to the target destination.

It will be clear to those skilled in the art how to perform each of tasks 901 through 908.

Figure 10:
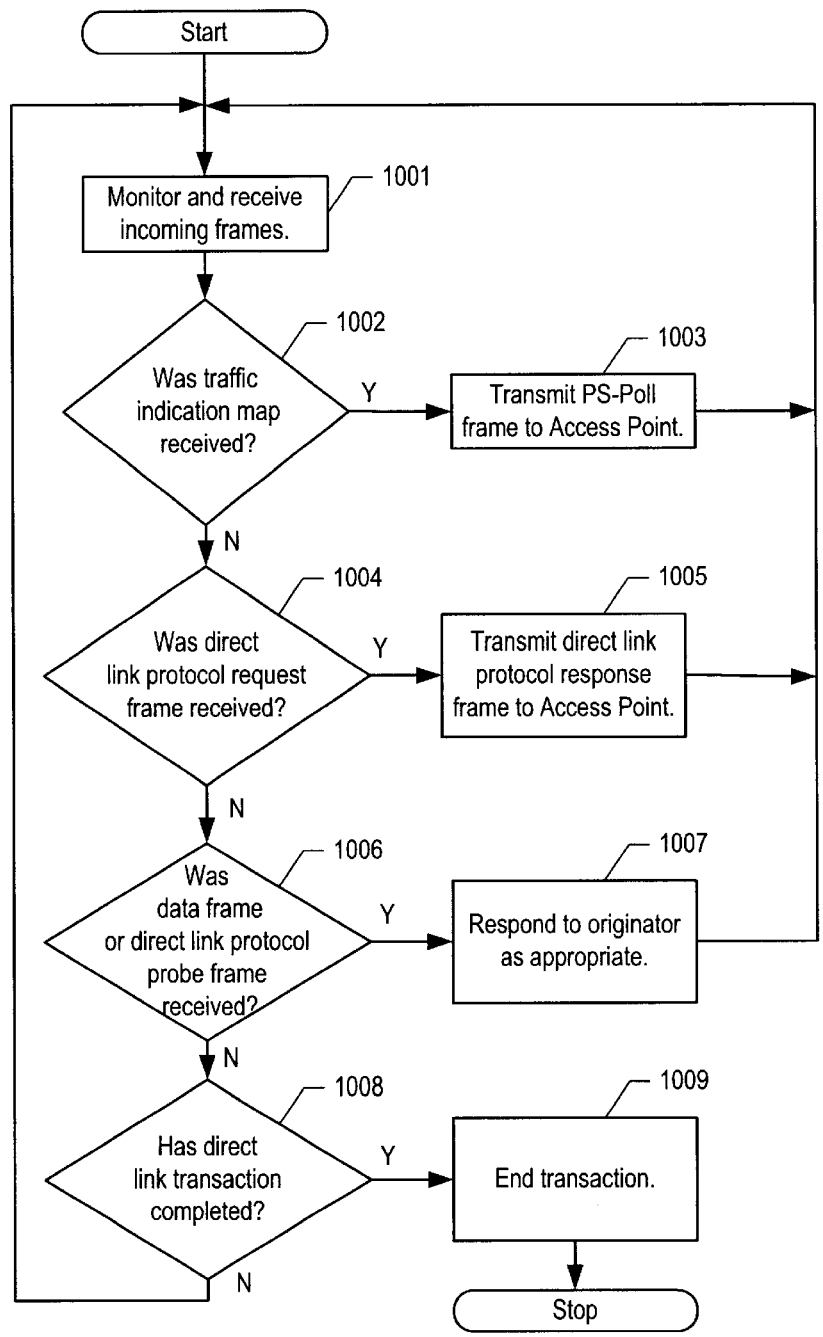
FIG. 10 depicts a flowchart of the tasks performed by receiving Q-station 301-$h$, in accordance with the illustrative embodiment of the present invention.

FIG. 10 depicts a flowchart of the tasks constituting the illustrative embodiment of the present invention and performed by Q-station 301-2, consistent with the earlier example in which Q-station 301-2 is the Q-station being requested to be part of a direct link. It will be clear to those skilled in the art which of the tasks depicted in FIG. 10 can be performed simultaneously or in a different order than that depicted.

At task 1001, Q-station 301-2 monitors shared communications network 300 for incoming frames and receives the frames. For each received frame, Q-station 301-2 also decodes the frame to determine the frame type, whether or not Q-station 301-2 is the target destination of the frame, and other characteristics of the frame. It will be clear to those skilled in the art how to monitor for incoming frames and to receive and decode intended frames. It will also be clear to those skilled in the art how to recognize the particular type of frame received.

When a frame for Q-station 301-2 is present, Q-station 301-2 takes additional action, as subsequently described.

At task 1002, Q-station 301-2 determines if the received and decoded frame comprises a traffic indication map from access point 303 that indicates that Q-station 301-2 has a frame waiting. If not, control proceeds to task 1004. If the received frame comprises a traffic indication map, control proceeds to task 1003.

At task 1003, Q-station 301-2 transmits a PS-Poll frame in well-known fashion to access point 303 to request that the queued frame be sent. Control in Q-station 301-2 proceeds to task 1001.

At task 1004, Q-station 301-2 determines if the received and decoded frame is a direct_link_protocol_request frame. If not, control proceeds to task 1006. If the received frame is a direct_link_protocol_request frame, control proceeds to task 1005.

At task 1005, Q-station 301-2 transmits a direct_link_protocol_response frame to access point 303. Control in Q-station 301-2 proceeds to task 1001.

At task 1006, Q-station 301-2 determines if the received and decoded frame is either a data frame or a direct_link_protocol_probe frame. If not, control proceeds to task 1008. If the received frame is either a data frame or a direct_link_protocol_probe frame, control proceeds to task 1007.

At task 1007, Q-station 301-2 responds to the originator of the received frame as appropriate. If Q-station 301-2 received a data frame, Q-station 301-2 transmits an acknowledgement frame in well-known fashion. If Q-station 301-2 received a direct_link_protocol_probe frame, station 301-2 transmits an indication (e.g., null frame, etc.) to the originator that the probe was received. Control in Q-station 301-2 proceeds to task 1001.

At task 1008, Q-station 301-2 determines if the current direct link transaction in which it is involved has completed. If not, control proceeds to task 1001. If the transaction has completed, control proceeds to task 1009.

At task 1009, Q-station 301-2 ends the transaction. Essentially, it does so by no longer transmitting frames directly to another station until another transaction is set up (i.e., by receiving another direct_link_protocol_request frame and responding to that frame). Furthermore, Q-station 301-2 will ignore future direct communication attempts received until another transaction is set up.

It will be clear to those skilled in the art how to perform each of tasks 1001 through 1009.

Figure 11:
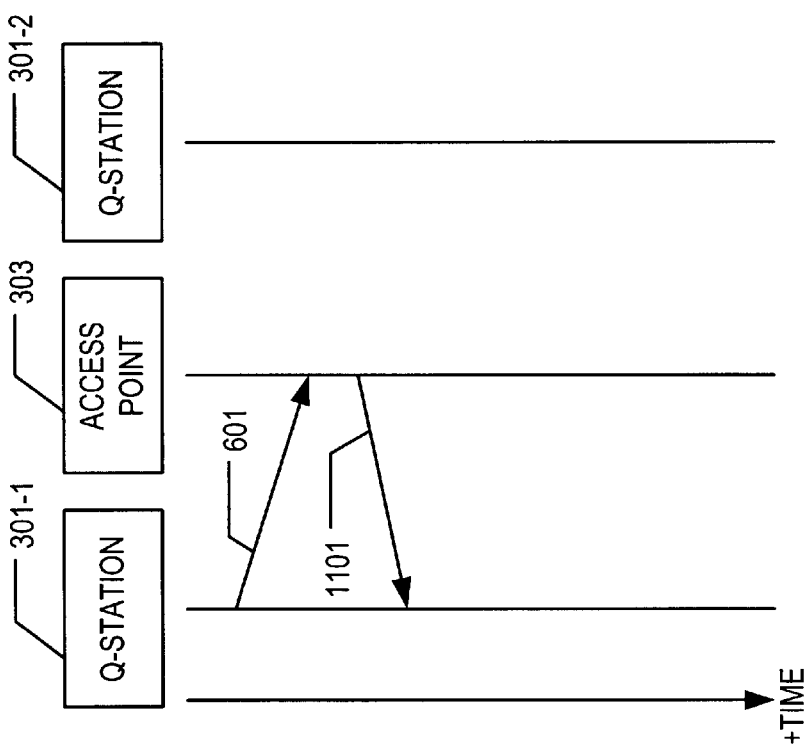
FIG. 11 depicts a message flow diagram of the first error scenario, in accordance with the illustrative embodiment of the present invention.

FIG. 11 depicts a message flow diagram of the first error scenario, in accordance with the illustrative embodiment of the present invention. Q-station 301-1 transmits first direct_link_protocol_request frame 601 to access point 303, requesting that a direct link be set up with Q-station 301-2. In this scenario, when access point 303 receives the frame, it can choose to deny the direct link. There are multiple reasons for denying the direct link. The reason might be because the direct link is not enabled in the BSS policy (i.e., the direct link is not allowed). The reason might be because the destination Q-station is not present with the quality-of-service enhanced BSS (QBSS). The reason might be because the destination Q-station is not willing or not able to participate in a direct link. For example, the target destination might not, in fact, be a Q-station, as opposed to a legacy station. There could be other reasons for denying a direct link to Q-station 301-1. Access point 303 notifies Q-station 301-1 by transmitting direct_link_protocol_response frame 1101 comprising a reason code that indicates the reason for denial. It will be clear to those skilled in the art how to format and transmit the frames involved.

Figure 12:
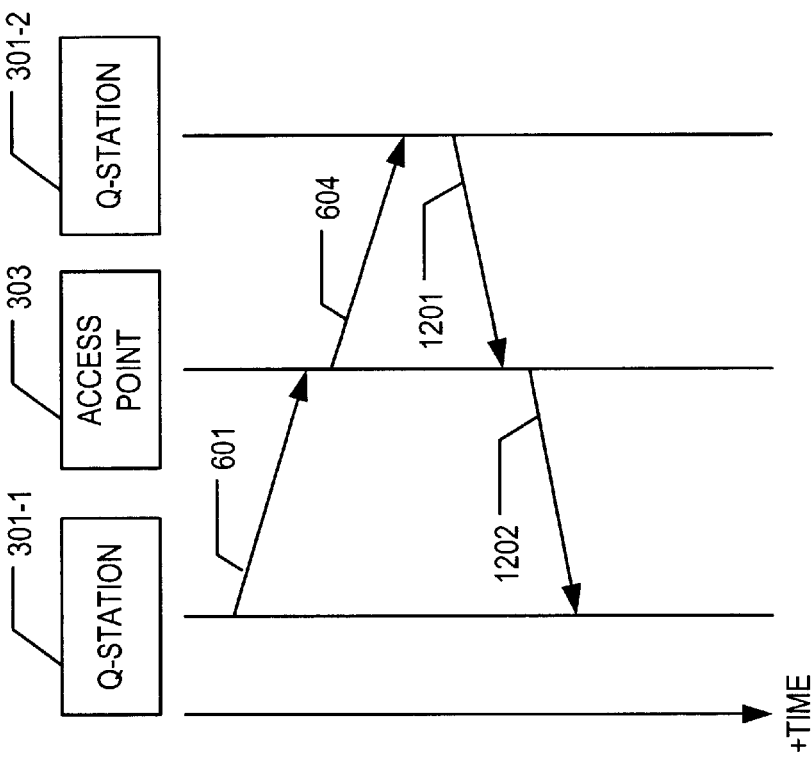
FIG. 12 depicts a message flow diagram of the second error scenario, in accordance with the illustrative embodiment of the present invention.

FIG. 12 depicts a message flow diagram of the second error scenario, in accordance with the illustrative embodiment of the present invention. Q-station 301-1 transmits first direct_link_protocol_request frame 601 to access point 303, requesting that a direct link be set up with Q-station 301-2. When access point 303 receives the frame, it forwards the frame information (using second direct_link_protocol_request frame 604) to Q-station 301-2. In this scenario, Q-station 301-2 can choose to deny the direct link. There are multiple reasons for denying the direct link. For example, the destination Q-station is not willing to participate in a direct link. There could be other reasons for denying a direct link to Q-station 301-1. Q-station 301-2 notifies Q-station 301-1 by transmitting direct_link_protocol_response frame 1201 comprising a reason code that indicates the reason for denial to access point 303. In turn, access point 303 forwards the information to Q-station 301-1 via direct_link_protocol_response frame 1202. It will be clear to those skilled in the art how to format and transmit the frames involved.

Figure 13:
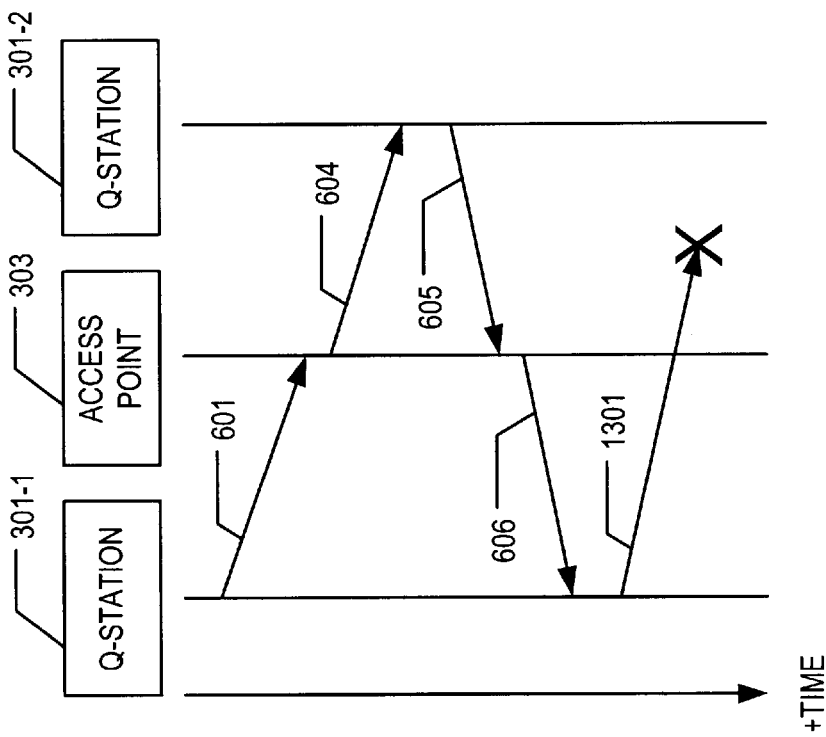
FIG. 13 depicts a message flow diagram of the third error scenario, in accordance with the illustrative embodiment of the present invention.

FIG. 13 depicts a message flow diagram of the third error scenario, in accordance with the illustrative embodiment of the present invention. In this scenario, a direct link is, in fact, permitted. Stations 301-1 and 301-2, along with access point 303, determine this by using first and second direct_link_protocol_request frames 601 and 604, and by using first and second direct_link_protocol_response frames 605 and 606 in the manner described earlier. Subsequently, Q-station 301-1 attempts to transmit frame 1301 directly to Q-station 301-2. For example, frame 1301 can be a data frame or a direct_link_protocol_probe frame. Q-station 301-2, however, never receives frame 1301. This, for example, can be because Q-station 301-1 and Q-station 301-2 are too far apart; in essence, Q-station 301-2 cannot "hear" Q-station 301-1. Q-stations 301-1 and 301-2 recover from this scenario by waiting until their respective timeouts occur, after which times, Q-stations 301-1 and 301-2 revert to sending all messages to each other through access point 303. It will be clear to those skilled in the art how to format and transmit the frames involved.

Similarly, Q-station 301-2 might have attempted to transmit a frame (e.g., data frame, direct_link_protocol_probe frame, etc.) to Q-station 301-1, but Q-station 301-1 never receives the frame. Q-stations 301-1 and 301-2 recover from this scenario by waiting until their respective timeouts occur, after which times, Q-stations 301-1 and 301-2 revert to sending all messages to each other through access point 303. It will be clear to those skilled in the art how to format and transmit the frames involved.

Figure 14:
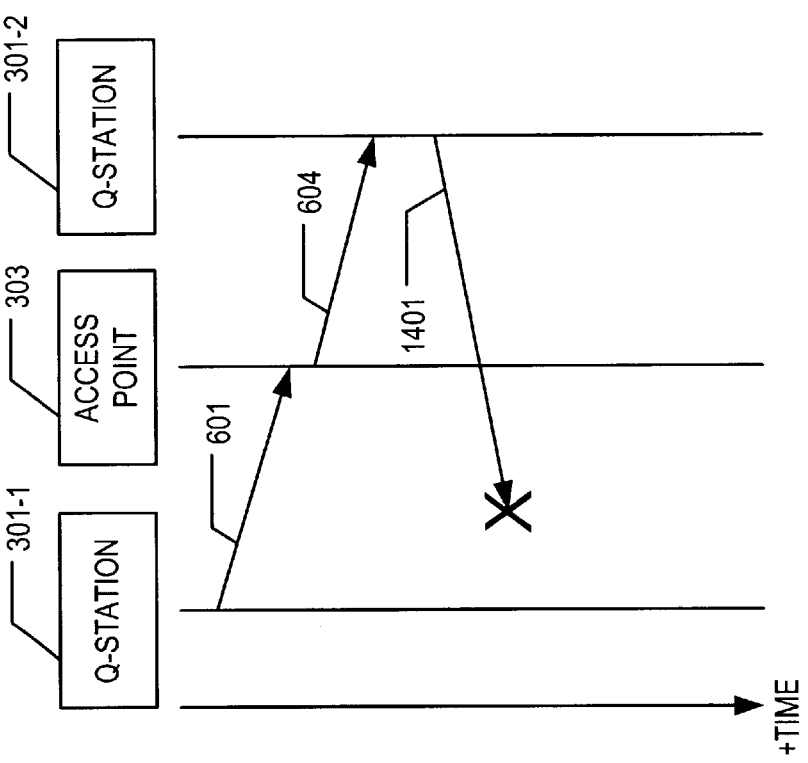
FIG. 14 depicts a message flow diagram of the fourth error scenario, in accordance with the illustrative embodiment of the present invention.

FIG. 14 depicts a message flow diagram of the fourth error scenario, in accordance with the illustrative embodiment of the present invention. A direct link is negotiated using first and second direct_link_protocol_request frames 601 and 604. In this scenario, Q-station 301-2, transmits direct_link_protocol_response frame 1401 directly back to Q-station 301-1 (as opposed to through access point 303). Q-station 301-1, however, never receives direct_link_protocol_response frame 1401. This, for example, can be because Q-station 301-1 and Q-station 301-2 are too far apart; in essence, Q-station 301-1 cannot "hear" Q-station 301-2. Q-stations 301-1 and 301-2 recover from this scenario by waiting until their respective timeouts occur, after which times, Q-stations 301-1 and 301-2 revert to sending all messages to each other through access point 303. It will be clear to those skilled in the art how to format and transmit the frames involved.

It is to be understood that the above-described embodiments are merely illustrative of the present invention and that many variations of the above-described embodiments can be 'devised by those skilled in the art without departing from the scope of the invention. It is therefore intended that such variations be included within the scope of the following claims and their equivalents.

What is claimed is:

1. A method comprising:

receiving at an access point from a first Q-station a direct_link_protocol_request frame that indicates a second Q-station as the destination of said direct_link_protocol_request frame;

transmitting from said access point a traffic indication map that indicates that traffic is available for said second Q-station;

receiving at said access point, in response to the transmission of said traffic indication map, a PS-Poll frame from said second Q-station; and forwarding from said access point, in response to the reception of said PS-Poll frame, said direct_link_protocol_request frame to said second Q-station.

2. The method of claim 1 further comprising:

receiving at said access point from said second Q-station, in response to forwarding said direct_link_protocol_request frame, a direct_link_protocol_response frame that indicates said first Q-station as the destination of said response frame; and forwarding from said access point, in response to said direct_link_protocol_response frame, said direct_link_protocol_response frame to said first Q-station.

3. The method of claim 1 wherein said direct_link_protocol_request frame comprises a destination medium access control address, a source medium access control address, capability information of said first Q-station, supported rates information of said first Q-station, and extended capabilities information of said first Q-station.

4. The method of claim 1 wherein said direct_link_protocol_response frame comprises a destination medium access control address, a source medium access control address, capability information of said second Q-station, supported rates information of said second Q-station, and extended capabilities information of said second Q-station.

5. A system comprising:
(1) a first station for:
    (a) transmitting, in response to receiving a direct_link_protocol_response frame, at least one data frame directly to a second station;
(2) an access point for:
    (a) queuing a direct_link_protocol_request frame;
    (b) transmitting a traffic indication map that indicates that traffic is available for said second station;
    (c) forwarding, in response to receiving a PS-Poll frame from said second station, said direct_link_protocol_request frame to said second station for the purpose of establishing a direct link between said first station and said second station; and
    (d) forwarding, in response to receiving said direct_link_protocol_response frame from said second station, said direct_link_protocol_response frame to said first station; and
(3) said second station for:
    (a) transmitting, in response to receiving said traffic indication map, said PS-Poll frame to said access point; and
    (b) transmitting, in response to receiving said direct_link_protocol_request frame from said access point, said direct_link_protocol_response frame to said access point.

6. The system of claim 5 wherein said first station also transmits, in response to receiving said direct_link_protocol_response frame, a direct_link_protocol_probe frame directly to said second station.

7. The system of claim 5 wherein said second station also transmits, subsequent to transmitting said direct_link_protocol_response frame, a direct_link_protocol_probe frame directly to said first station.

8. The system of claim 5 wherein said first station initiates said direct link with said second station by transmitting said direct_link_protocol_request frame to said access point.

9. The system of claim 5 wherein said first station and said second station are quality-of-service enhanced.

10. The system of claim 5 wherein said first station and said second station remain active for the duration of said direct link.

11. The system of claim 5 wherein said access point attaches said first station and said second station to a wired backbone network.

12. A method comprising:
receiving at said first Q-station from an access point a traffic indication map that indicates that traffic is available for said first Q-station;
transmitting from said first Q-station, in response to receiving said traffic indication map, a PS-Poll frame to said access point; and
receiving at said first Q-station from said access point, in response to transmitting said PS-Poll frame, a direct_link_protocol_request frame that indicates a second Q-station as the source.

13. The method of claim 12 further comprising:
transmitting from said first Q-station to said access point, in response to receiving said direct_link_protocol_request frame, a direct_link_protocol_response frame that indicates said second Q-station as the destination of said response frame; and
receiving at said first Q-station directly from said second Q-station, in response to transmitting said direct_link_protocol_response frame, at least one data frame.

14. The method of claim 13 wherein said first Q-station remains ready to communicate directly with said second Q-station for at least the duration of about aDLPIdleTimeout after said first Q-station transmits said direct_link_protocol_response frame.

15. The method of claim 13 wherein said direct_link_protocol_request frame and said direct_link_protocol_response frame comprise security information.

16. The method of claim 13 further comprising receiving at said first Q-station directly from said second Q-station a direct_link_protocol_probe frame.

17. The method of claim 16 wherein said direct_link_protocol_probe frame comprises a destination medium access control address, a source medium access control address, and random data.

18. The method of claim 12 further comprising transmitting from said first Q-station to said access point, in response to receiving said direct_link_protocol_request frame, a direct_link_protocol_response frame that indicates said second Q-station as the destination of said response frame and that the first Q-station is not willing to participate in direct link communication with said second Q-station.

19. The method of claim 12 further comprising:
transmitting from said first Q-station directly to said second Q-station, in response to receiving said direct_link_protocol_request frame, a direct_link_protocol_response frame that indicates said second Q-station as the destination of said response frame; and
receiving at said first Q-station directly from said second Q-station, in response to transmitting said direct_link_protocol_response frame, at least one data frame.

20. A first station comprising:
(1) a receiver for:
    (a) receiving a traffic indication map; and
    (b) receiving a direct_link_protocol_request frame; and
(2) a transmitter for:
    (a) transmitting, in response to receiving said traffic indication map, a PS-Poll frame; and
    (b) transmitting, in response to receiving said direct_link_protocol_request frame, a direct_link_protocol_response frame.

21. The first station of claim 20 wherein said first station also receives a direct_link_protocol_probe frame directly from a second station.

22. The first station of claim 20 wherein said first station remains active for the duration of said direct link wherein the duration starts when said first station transmits said direct_link_protocol_response frame.

23. The first station of claim 20 wherein said first station is quality-of-service enhanced.

* * * * *